United States Patent

Kobayashi et al.

(10) Patent No.: US 6,427,330 B1
(45) Date of Patent: Aug. 6, 2002

(54) METHOD FOR FORMING A LUBRICANT COATING ON A HYDRODYNAMIC BEARING APPARATUS BY ELECTRODE POSITIONING

(75) Inventors: Toshihiro Kobayashi; Yasushi Mizusaki, both of Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 38 days.

(21) Appl. No.: 09/650,488

(22) Filed: Aug. 29, 2000

Related U.S. Application Data

(62) Division of application No. 09/165,259, filed on Oct. 1, 1998, now abandoned.

(30) Foreign Application Priority Data

Oct. 7, 1997 (JP) .............................................. 9-291515
Oct. 7, 1997 (JP) .............................................. 9-291516

(51) Int. Cl.⁷ .............................................. B21D 53/10
(52) U.S. Cl. ................................ 29/898.02; 29/898.12; 205/122
(58) Field of Search ........................... 29/898.02, 898.1, 29/898.11, 898.12, 898.13, 898.14; 384/100, 107, 112, 114, 115, 118, 120, 123, 121; 204/194, 212; 205/121, 122, 50, 67

(56) References Cited

U.S. PATENT DOCUMENTS 3,586,340 A * 6/1971 Otto
4,883,367 A * 11/1989 Maruyama
5,141,338 A * 8/1992 Asada et al.
5,348,634 A * 9/1994 Matsuo et al.
5,407,281 A * 4/1995 Chen
5,441,995 A * 8/1995 Ohgaki et al.
5,565,079 A * 10/1996 Griego
5,579,579 A * 12/1996 Chen
5,716,141 A * 2/1998 Chen
5,718,516 A * 2/1998 Cheever et al.
5,743,655 A * 4/1998 Slavin et al.
5,760,502 A * 6/1998 Van Loenen et al.
5,770,906 A * 6/1998 Hazelton et al.
5,806,987 A * 9/1998 Nose et al.
6,155,721 A * 12/2000 Kurosawa et al.

* cited by examiner

Primary Examiner—David P. Bryant
(74) Attorney, Agent, or Firm—Reed Smith LLP

(57) ABSTRACT

A hydrodynamic bearing apparatus comprises at least a pair of hydrodynamic bearing surfaces that face each other in the radial direction which are formed with an outer circumferential surface of a shaft unit and an inner circumferential surface of a shaft fitting unit relatively and rotatably attached to the shaft unit. Hydrodynamic pressure generating grooves of a predetermined shape are produced on either one of the hydrodynamic bearing surfaces of the shaft unit and shaft fitting unit. A lubricant coating is formed by electrodeposition on either of the hydrodynamic bearing surfaces of the shaft unit and shaft fitting unit. A method for manufacturing a hydrodynamic bearing is also disclosed.

13 Claims, 9 Drawing Sheets

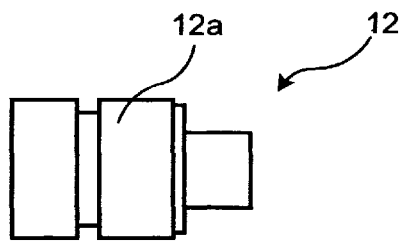
F I G. 1A
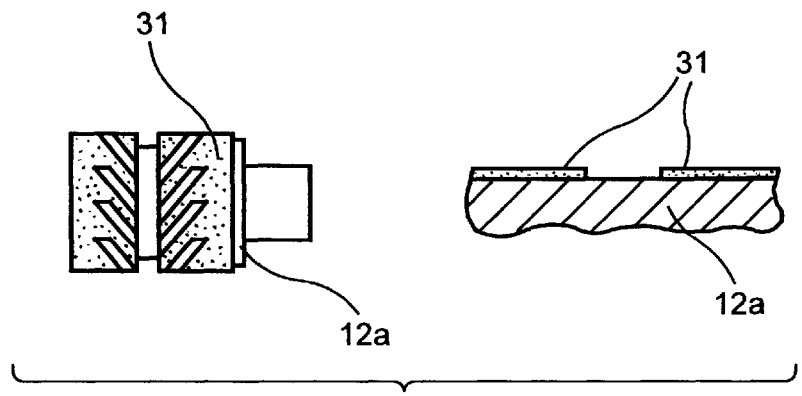
F I G. 1B
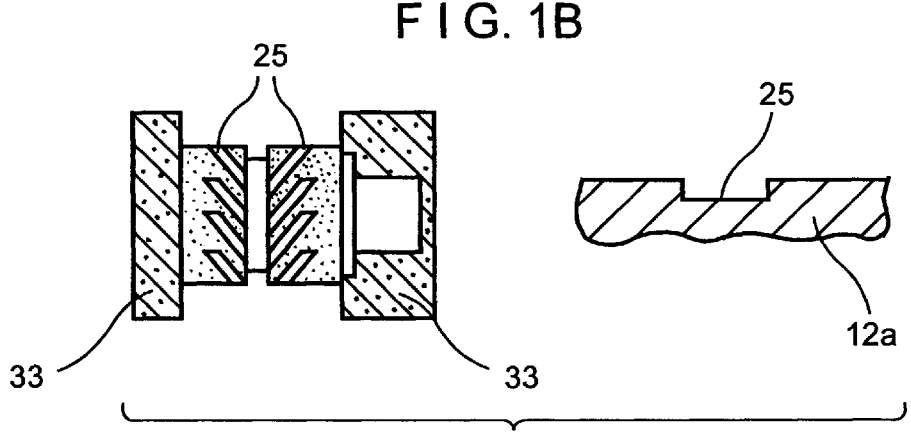
F I G. 1C
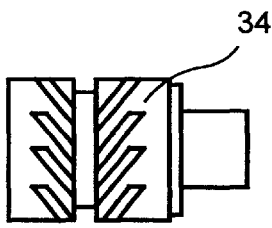
F I G. 1D

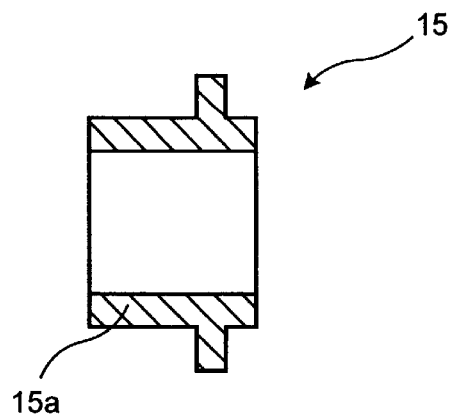
F I G. 2A
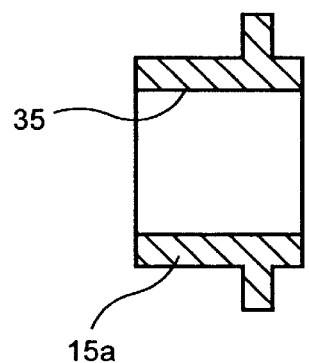
F I G. 2B
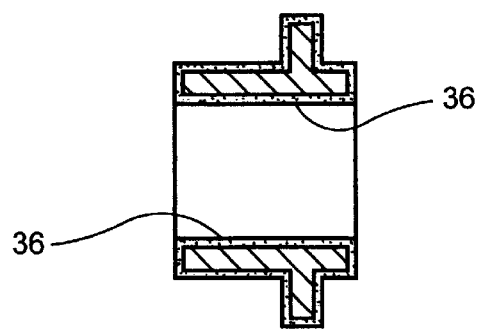
F I G. 2C

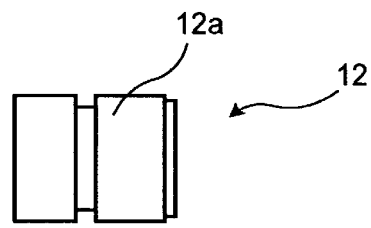
F I G. 3A
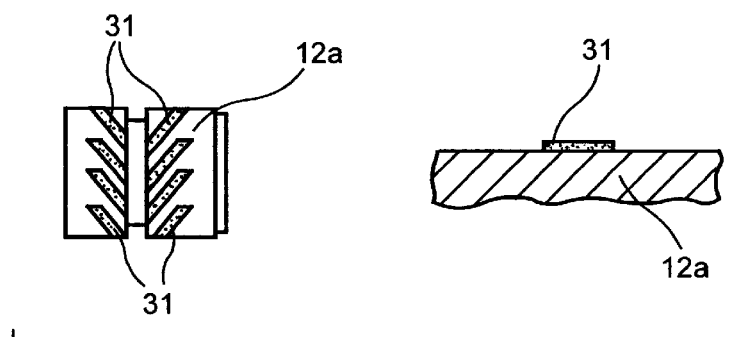
F I G. 3B
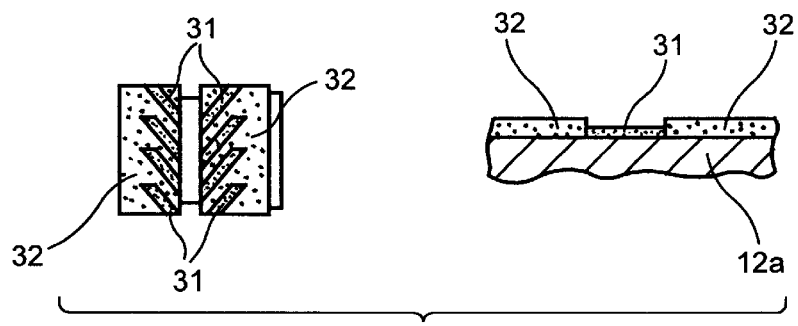
F I G. 3C
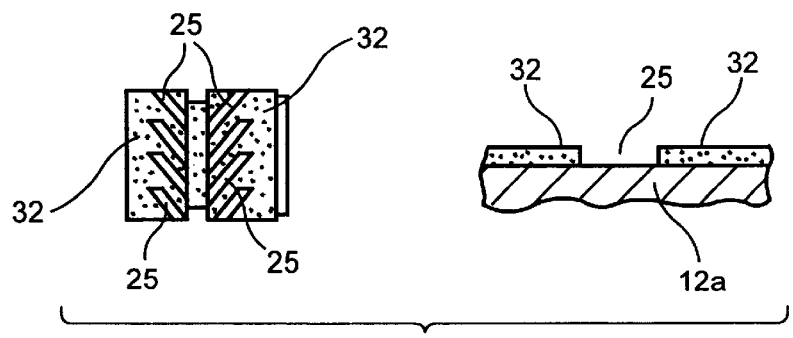
F I G. 3D

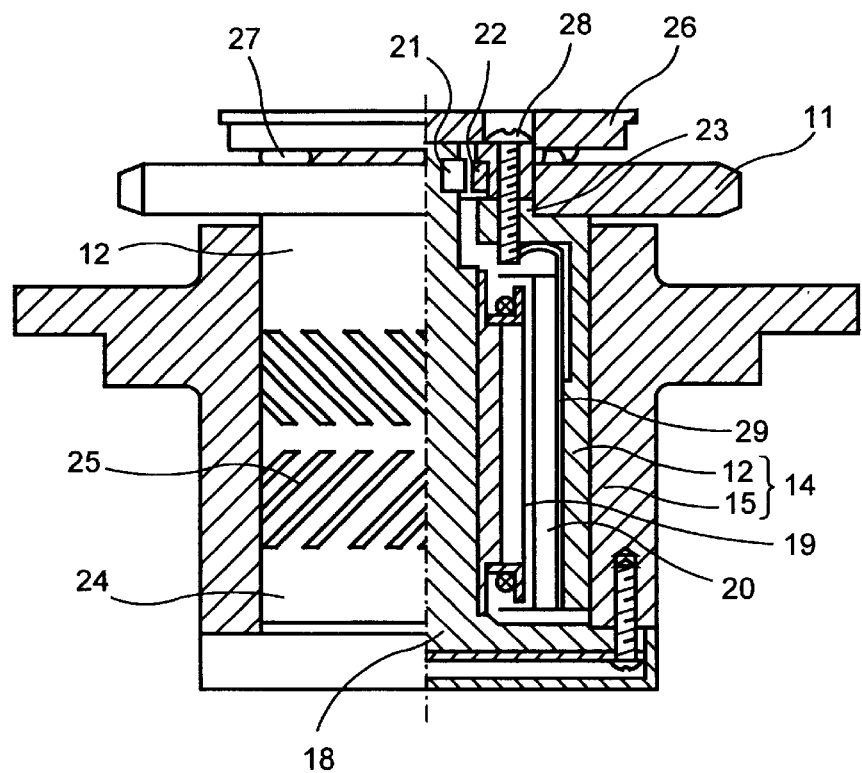
F I G. 6
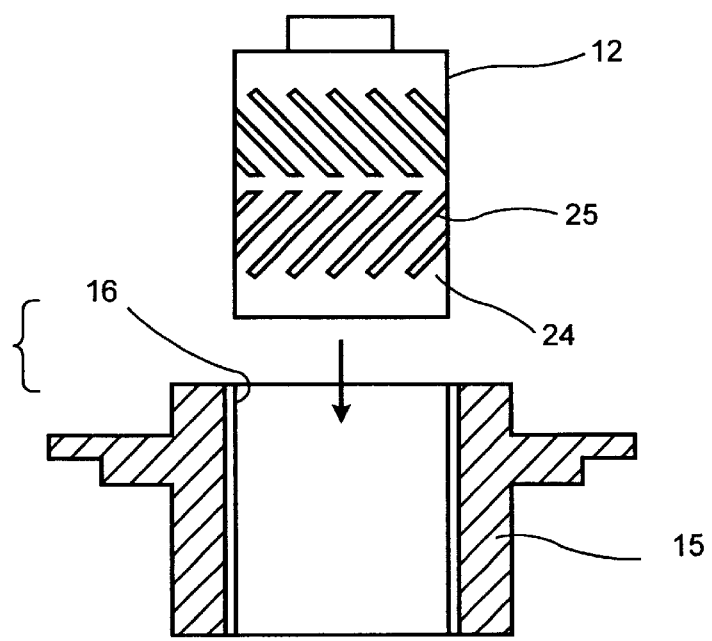
F I G. 7

METHOD FOR FORMING A LUBRICANT COATING ON A HYDRODYNAMIC BEARING APPARATUS BY ELECTRODE POSITIONING

This is a division of application Ser. No. 09/165,259, filed Oct. 1, 1998, now abandoned.

BACKGROUND OF THE INVENTION a) Field of the Invention

The present invention relates to a hydrodynamic bearing apparatus, in which a dynamic pressure is generated in a lubricant fluid and thereby a shaft unit and a shaft fitting unit are relatively and rotatably supported, and its manufacturing method.

b) Description of the Related Art

Various proposals have been made in recent years for hydrodynamic bearing motors which rotate various rotary disks such as polygon mirrors, magnetic disks, optical disks, etc. In such hydrodynamic bearing apparatus, a hydrodynamic bearing surface on the shaft unit side and that on the shaft fitting unit side are formed to face each other in the radial direction with a predetermined gap. A hydrodynamic bearing portion is created in the facing gap. Hydrodynamic pressure generating grooves are produced on either one of the hydrodynamic bearing facing surfaces. The lubricant fluid injected in the hydrodynamic bearing portion, such as air or oil, is pressured by a pumping action of the hydrodynamic pressure generating grooves during the rotation, and by the dynamic pressure of the lubricant fluid the shaft unit and the shaft fitting unit are relatively and rotatably supported.

Generally, the surface of one of the hydrodynamic bearing surfaces of the shaft unit and shaft fitting unit in such a hydrodynamic bearing apparatus is coated with a lubricant coating material (see FIG. 8), and the other surface is plated (see FIG. 10). Thus, two types of coatings are cooperatively used.

For example, to coat the lubricant coating material on the shaft fitting unit, a blank 1 of the shaft fitting unit as illustrated in FIG. 8 (a) is first formed of aluminum or aluminum alloy by molding or die casting.

Then, as illustrated in FIG. 8 (b), a base treatment 2 with, for example, chromadization or anodic oxidization, is given to improve resistance and coating contact. Also, a masking 3 is given on a portion of the outer surface of the blank 1. As illustrated in FIG. 8 (c), a lubricant coating material 4 containing PTFE (polytetrafluroroethylene), for example, is coated by spray, etc. over the inner surface of the blank 1 and dried, followed by three to five repetitions of spraying for thick coating. Such a thick coating is given because of the uneven thickness of the coating caused by foaming or dripping of the coating material. A material having such uneven coating is given a lathe 5, as illustrated in FIG. 8 (d), and finished so that the thickness of the coating material 4 becomes about 15 micron to obtain a precise inner diameter. Same is for applying the lubricant coating material on the shaft unit.

For coating the lubricant coating material on the shaft unit, supposing that the shaft unit has hydrodynamic pressure generating grooves, the process is as illustrated in FIG. 9. For cutting the hydrodynamic pressure generating grooves, a blank 6 of a shaft unit as illustrated in FIG. 9 (a) is first formed of aluminum or aluminum alloy by lathe or die casting. As FIG. 9 (b) shows, a cap 8 is fitted to a chuck portion 6a of the blank 6 and then, a base treatment with, for example, chromadization or anodic oxidization (alumite method) is carried out to improve resistance and coating contact.

As illustrated in FIG. 9 (c), the lubricant coating material 4 containing PTFE (polytetrafluroroethylene), for example, is applied by spray, etc. over the outer surface of the blank 6 and dried, followed by three to five repetitions of spraying for thick coating. Such a thick coating is given because of the uneven thickness of the coating caused by foaming or dripping of the coating material. A material having such uneven coating is given a lathe 5, as illustrated in FIG. 9 (d), to roughly obtain the outer diameter, and then, hydrodynamic pressure generating grooves 9 are produced on the outer circumferential surface by machining, as illustrated in FIG. 9 (e).

Finally, as FIG. 9 (f) shows, a lathe 5 is given again to finish the blank such that the thickness of the coating material 4 becomes about 15 micron to obtain a precise outer diameter as well as to remove burr produced during the grooving. Same is for grooving the shaft fitting unit that is a counterpart of the shaft unit.

For plating the hydrodynamic bearing surface on the shaft unit, hydrodynamic pressure generating grooves are formed prior to plating when the bearing surface has the grooves. In other words, as illustrated in FIG. 10 (b), a masking printing 7 is carried out on the portion of the blank 6 illustrated in FIG. 10 (a) other than the hydrodynamic pressure generating grooves. With caps 8 fitted to the ends, etching is carried out to produce the hydrodynamic pressure generating grooves 9, as illustrated in FIG. 10 (c).

The next step is plating. FIG. 10 (d) shows a prior treatment of degreasing, activation, etc. After this, as illustrated in FIG. 10 (e), the cap 8 is fitted to the edge for zinc substitution on the surface, and then a plating treatment such as electroless nickel plating is carried out as in FIG. 10 (f).

However, such conventional hydrodynamic bearing apparatus and its manufacturing method have the following drawbacks.

The coating process of the lubricant coating material 4 as illustrated in FIGS. 8 and 9 requires time due to the thick coating, and moreover, a finishing process such as lathe 5 is needed to produce the coating of even thickness. In addition, the base treatment should be carried out precisely. If not, the contact of the coating material is degraded, causing expansion of the lubricant coating material coated surface, peeling, and corrosion of the material. In other words, since the conventional manufacturing process requires the strict process management for quality control, the productivity is not high but the manufacturing cost is high.

Also, the plating treatment as FIG. 10 involves many steps (about 50 steps). Thus, the conventional hydrodynamic bearing apparatus has the drawbacks of poor productivity and high manufacturing cost.

In addition, with the plating treatment, the resistance against corrosion is still not enough. Besides, the surface grows granular fracture, resulting in producing rough surface (not smooth) and making it easy to generate abrasion powder at use. Therefore, this can be a big problem for the apparatus which requires cleanness.

Also, the machining of the hydrodynamic pressure generating grooves 9 requires time and a post treatment such as burr removal. Thus, the conventional manufacturing process is complicated, requiring time for manufacturing. Moreover, many expensive devices need to be prepared.

The process may include a step of coating after producing the hydrodynamic pressure generating grooves by etching or machining. However, the same problems as above are accompanied.

OBJECT AND SUMMARY OF THE INVENTION

A primary object of the present invention is to provide a hydrodynamic bearing apparatus in which the hydrodynamic bearing surface, of high quality and excellent resistance, can be formed on a shaft unit or a shaft fitting unit in a simple process. The present invention also encompasses a method for manufacturing a hydrodynamic bearing apparatus in which the hydrodynamic bearing surface and the hydrodynamic pressure generating grooves of high quality can be formed simply.

In accordance with the invention, a hydrodynamic bearing apparatus comprises at least a pair of hydrodynamic bearing surfaces that face each other in the radial direction which are formed with an outer circumferential surface of a shaft unit and an inner circumferential surface of a shaft fitting unit relatively and rotatably attached to the shaft unit. Hydrodynamic pressure generating grooves of a predetermined shape are produced on either one of the hydrodynamic bearing surfaces of the shaft unit and shaft fitting unit. A lubricant coating is formed by electrodeposition on either of the hydrodynamic bearing surfaces of the shaft unit and shaft fitting unit. The invention also encompasses a method for manufacturing a hydrodynamic bearing.

BRIEF DESCRIPTION OF THE DRAWINGS

In the drawings:

FIGS. 1a, 1b, 1c and 1d show a manufacturing process of a shaft unit of an embodiment of the present invention;

FIGS. 2a, 2b and 2c show a manufacturing process of a shaft fitting unit of an embodiment of the present invention;

FIGS. 3a, 3b, 3c and 3d show a manufacturing process of another shaft unit different from the embodiment of FIG. 1 of the present invention;

FIG. 6 is a cross-sectional view of an example of a rotary-shaft-type polygon mirror drive motor which has the hydrodynamic bearing of the present invention and is different from the one in FIG. 4;

FIG. 7 is a side view showing the relationship between the shaft unit and the bearing unit of the motor illustrated in FIG. 6;

DESCRIPTION OF THE PREFERRED EMBODIMENTS

Figure 4:
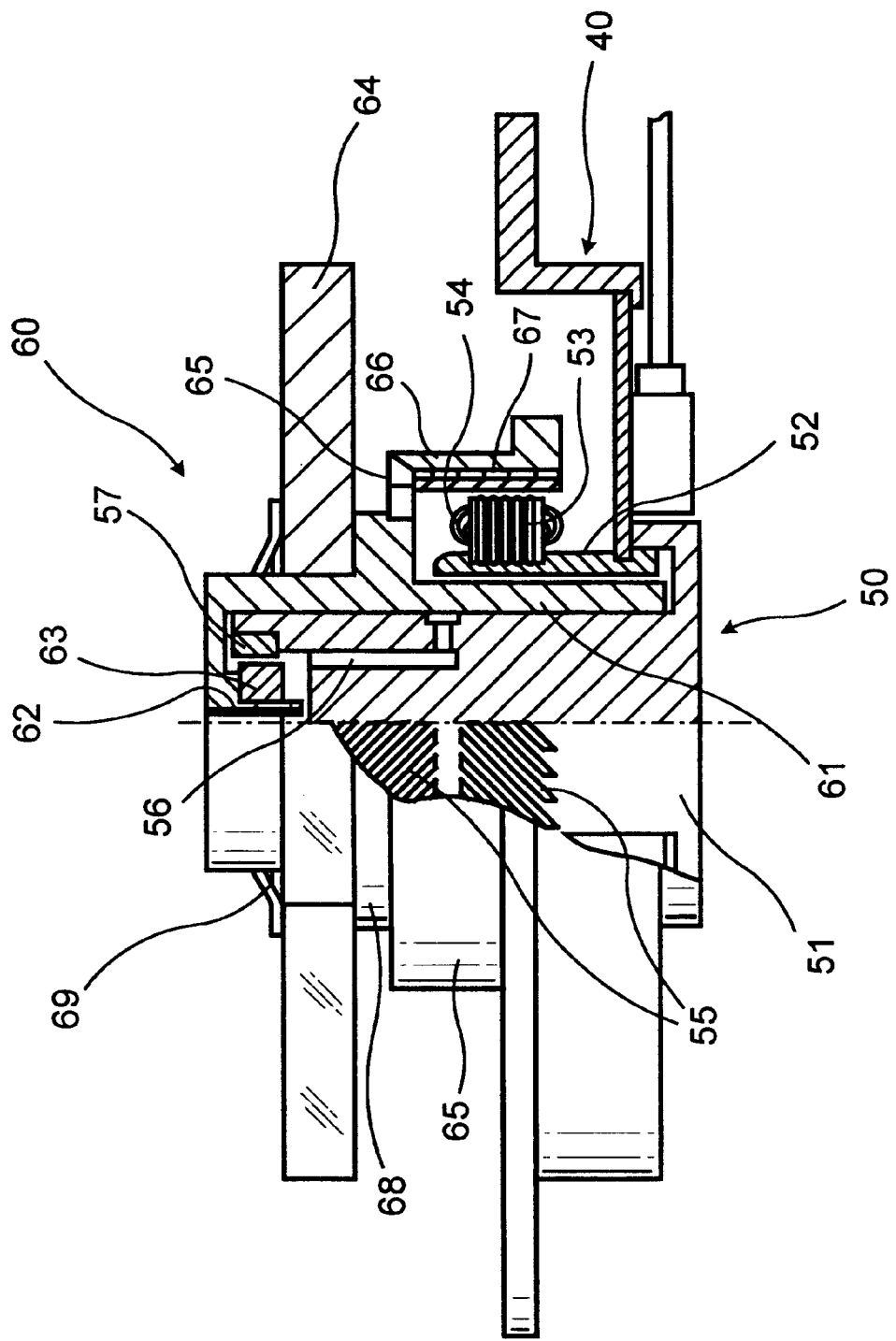
FIG. 4 is a cross-sectional view of an example of a shaft-fixed-type polygon mirror drive motor having a hydrodynamic bearing to which the present invention is applied.

Embodiments of the present invention will be described below. An embodiment of a method for manufacturing a rotor 12 as the shaft unit will be first described.

First, a blank 12a of the rotor 12 as illustrated in FIG. 1 (a) is formed of aluminum, aluminum alloy, or magnesium alloy by molding, die casting, or other methods. The hydrodynamic pressure generating grooves are produced in advance if there are. In other words, as illustrated in FIG. 1 (b), a masking printing 31 is given to portions other than the hydrodynamic pressure generating grooves forming portions and an etching treatment and the like is given with caps 33 fitted at the ends to produce hydrodynamic pressure generating grooves 25.

After removing the masking printing 31, a hard alumetizing treatment starts. A prior treatment such as greasing, activation, etc. is carried out, and then, an anodic oxidization coating (alumetized layer) 34 is deposited on the entire outer circumferential surface of the rotor material. The hard alumetizing treatment is carried out with, for example, sulfic acid bath, oxalic acid bath, mixing bath, pulse electrolysis, etc, and the current in the oxidization chamber and the time are controlled to produce a layer of 10 to 20 micron thick, for example.

An embodiment of a method for manufacturing a bearing 15 as a shaft fitting unit will be described.

A blank 15a of the bearing 15 as illustrated in FIG. 2 (a) is formed of aluminum or aluminum alloy by molding, die casting, or other methods. As illustrated in FIG. 2 (b), a base treatment 35 such as chromatizing is given to the inner circumferential surface of the blank 15a to improve resistance and coating contact.

Next, the bearing material is put into an electrodeposition chamber (not illustrated) to coat the entire surface of the bearing material with electrodeposition (electrophoresis). The electrodeposition for coating the bearing material is carried out such that the rotor material is put into the coating material including the lubricant particles (PTFE) dispersed in water, and the current is applied such that the bearing material and other metallic units are electrolyzed in opposite electrodes to deposit the coating on the bearing material.

The thickness of the lubricant coating 36 made of the electrodeposition coating portion is controlled by the time and voltage for the electrodeposition. In this embodiment, the electrodeposition is carried out to make the coating about 5 to 15 micron thick. After the coating, a heating treatment is given to surface the lubricant particles (PTFE) and the resin is cured to form the coating.

According to such an embodiment, with the even coating effect of the electrodeposition, the lubricant coating 36 is easily obtained on the bearing 15 surface in the even thickness. The lubricant coating 36 made of the electrodeposition coating portion surfaces the lubricant particles during the coating; therefore, excellent lubricity can be obtained, thus improving the bearing property.

Even when the mother material to be coated has defects such as gross porosity, the electrodeposition promotes the coating material into the pores and the formed lubricant coating obtains a strong contact.

In this embodiment, the bearing 15 having the lubricant coating 36 that consists of the electrodeposition coating portion having excellent lubricity is used cooperatively with the rotor 12 having the anodic oxidization coating 34 which has excellent smoothness, so that abrasion resistance on the hydrodynamic bearing surface is improved, the generation of the abrasion powder is remarkably reduced, and the bearing gap is maintained and seizing is prevented. The anodic oxidization coating 34 of the rotor 12 is formed efficiently in a simple process as described above. Accordingly, while the performance of the hydrodynamic bearing apparatus is improved, the productivity is increased, thus obtaining the hydrodynamic bearing apparatus of high quality at low cost.

Next, another embodiment of the method for manufacturing the rotor 12 as the shaft unit, different from the embodiment of FIG. 1, will be described referring to FIG. 3.

First, the blank 12a of the rotor 12 as illustrated in FIG. 3 (a) is formed of aluminum or aluminum alloy by molding, die casting, or other methods, and then, a base treatment such as a chromatizing or an anodic oxidization (alumite method) is given to the outer surface of the blank 12a to improve resistance and coating contact.

Next, as illustrated in FIG. 3 (a), an epoxy type resin coating material having insulating capability is adhered along the shape of the hydrodynamic pressure generating grooves to be formed on the outer surface of the blank 12a to form an insulating coating 31. The coating of the insulating resin coating material is done by, for example, a screen printing or a masking printing using the screen printing etc.

The rotor material having the insulating coating 31 thereon is put in an electrodeposition chamber (not illustrated) to coat the entire surface of the rotor material with electrodeposition (electrophoresis) and deposit a coating. The electrodeposition coating consists of acrylic resin having, for example, PTFE (lubricant particles). The electrodeposition coating is carried out such that the rotor material is put into the coating material dispersed in water, and the current is applied such that the rotor material and other metallic unit are electrolyzed in opposite electrodes to attach the coating on the rotor material. However, the electrodeposition coating is not applied on the insulating coating 31. Based on this principle, as illustrated in FIG. 3 (c), the lubricant coating 32 consisting of the electrodeposition coating portion is formed on the surface other than the portion for forming the hydrodynamic pressure generating grooves 25. The portion for forming the hydrodynamic pressure generating grooves 25 is of no electrodeposition coating, on which the lubricant coating 25 is not formed, and the insulating coating 31 remains.

The thickness of the lubricant coating 32 consisting of the electrodeposition coating portion is controlled by the time and voltage for the electrodeposition. In this embodiment, the electrodeposition coating is given to be about 5 to 15 micron thick. After the coating, a heating treatment is given to cure the resin of the coating material so that a coating is formed.

Then, the insulating coating 31 coated on the portion with no electrodeposition coating is dissolved in solvent for removal. The insulation coating 31 removed portion exposes the outer surface of the rotor material. As illustrated in FIG. 3 (d), the hydrodynamic pressure generating grooves 25 are produced, after removing the insulating coating, by utilizing the step made between the outer surface of the rotor material at the portion with no electrodeposition coating and the outer surface of the lubricant coating 32 consisting of the electrodeposition coating portion.

According to such an embodiment, the electrodeposition coating provides the even coating effect, whereby the lubricant coating 32 is easily given in an even thickness over the entire circumference. Also, the hydrodynamic pressure generating grooves 25 are produced easily and precisely with no complicated processes. In this embodiment, in particular, the hydrodynamic pressure generating grooves 25 are produced using the fact that the electrodeposition coating is not given to the insulating resin coating 31; therefore, the hydrodynamic pressure generating grooves 25 can be formed very efficiently in a simple process of only electrodeposition coating.

At this time, the lubricant coating 32 consisting of the electrodeposition coating portion is formed to obtain excellent lubricity because the lubricant particles surface during the electrodeposition coating. Thus, the bearing property is improved.

Even when the rotor material to be coated has defects such as gross porosity, the electrodeposition promotes the coating material into the pores and the formed lubricant coating obtains a strong contact.

The insulating resin coating 31 is applied efficiently through a masking printing method as used in this embodiment; however, it may be applied through patterning by a film deposition or other methods such as photolithography.

The bearing made in the above manner can be applied in a motor as illustrated in FIG. 4. FIG. 4 shows an outer rotor type motor which has an air hydrodynamic bearing apparatus of shaft-fixed-type for rotating a polygon mirror 64. The air hydrodynamic bearing motor comprises a stator assembly 50 installed on the frame 40 side and a rotor assembly 60 fitted to the stator assembly 50 from the top in the figure. The stator assembly 50 has a fixed shaft 51 (as a shaft unit) standing upright at the center of the frame 40 and a cylindrical bearing holder 52 surrounding the outer circumference of the fixed shaft 51 with a predetermined distance in the radial direction. Fitted to the outer circumference of the bearing holder 52 is a stator core 53, a salient-pole of which is wound with a drive coil 54.

On the outer circumferential surface of the fixed shaft 51, herringbone-configured hydrodynamic pressure generating grooves 55 are annularly cut in two lanes (two blocks) in the axial direction. Outside the fixed shaft 51(as a shaft unit) on which the hydrodynamic pressure generating grooves 55, 55 are provided, a cylindrical portion 61 (as a shaft fitting unit) of the rotor assembly 60 is rotatably attached. An air hydrodynamic pressure is generated between the outer circumferential surface of the fixed shaft 51 and the inner circumferential surface of the cylindrical portion 61 of the rotor assembly 60 to form a radial bearing. In the fixed shaft 51, an air supply hole 56 extends axially from the shaft end (the top portion in the figure) of the fixed shaft 51 and opens outward of the fixed shaft 51 at the portion between the two lanes (two blocks) of the hydrodynamic pressure generating grooves 55, 55.

The shaft end (the top portion in the figure) of the fixed shaft 51 is formed such that the outer circumferential portion thereof axially protrudes by a predetermined amount, that is, the inner portion thereof is recessed, and a fixed magnet 57 for sustaining in the thrust direction is attached annularly on the inner circumferential wall of the protruded portion. In the center of the base portion (the top portion in the figure) of the cylindrical portion 61 in the rotor assembly 60, a porous air orifice 62 having a predetermined resistance against air flow is formed axially passing through to be a damper means. With the damper effect by an air resistance of the air orifice 62, the axial impact on the rotor assembly 60 is relieved. The air inside the rotor assembly 60 is sent to the portion between the hydrodynamic pressure generating grooves 55, 55 through the air supply hole 56, and flows axially outward (in the up and down direction in the figure) with the pumping action of the hydrodynamic pressure generating grooves 55, 55 to be discharged outside.

A rotary magnet 63 for sustaining the rotor assembly 60 in the thrust direction is attached annularly around the air orifice 62. The rotary magnet 63 is polarized in the axial direction (in the up and down direction in the figure) to cause magnetic attraction with the fixed magnet 57 of the fixed shaft 51. The rotor assembly 60 is sustained by a predetermined amount in the thrust direction with the magnetic attraction between both.

A hexagonal polygon mirror 64 as a rotary plate is fitted to the outer circumference of the base portion (the top portion in the figure) of the cylindrical portion 61 of the rotor assembly 60. The polygon mirror 64 is axially placed on a retaining portion 68 that extends outward in the radial direction from the cylindrical portion 61, and secured at the axially outside by a pressing spring 69 as a clamp means.

A rotor flange portion 65 extends outwardly in the radial direction from the retaining portion 68. The rotor flange portion 65 is made of a disk-like member which is formed together with the cylindrical portion 61 and the retaining portion 68 and placed to separate the rotor inner space, in which the drive coil 54 is placed, from the rotor outer space, in which the polygon mirror 64 is placed.

A drive magnet 67 is annularly attached via a back yoke made of a magnetic material on the inner circumferential wall of an annular mount plate 66 which projects in the axial direction (downward in the figure) from the outer circumferential portion of the rotor flange portion 65. The drive magnet 67 is placed to face the outer circumferential surface of the stator core 53 in the radial direction.

Note that, in the embodiment of FIG. 4, although the retaining portion 68, cylindrical portion 61, rotor flange 65, and mount portion 66 are integrally formed, each member may be formed separately.

The fixed shaft 51 having the hydrodynamic pressure generating grooves 55 in such a fixed-shaft-type bearing apparatus is also made in the same structure as the above described embodiment, and therefore, can be formed in the same manufacturing method. In addition, the same operation and effects can be obtained as the above embodiments.

Although the embodiments of the present invention by the present inventor has been described in detail, the present invention is not limited to the above embodiments. It should be understood that the present invention is variously modifiable within the scope of the invention.

The present invention can be applied not only when the hydrodynamic pressure generating grooves are produced on the shaft unit like each of the embodiments described above, for example, but also when they are produced on the shaft fitting unit. Also the present invention can be applied in the same manner even when the electrodeposition coating is given to the shaft unit and the anodic oxidization coating is formed on the shaft fitting unit.

Further, the above embodiments are about the hydrodynamic bearing apparatus using air as a lubricant fluid. However, the present invention can be applied to the apparatus using fluid such as oil.

Moreover, the present invention can be applied to the hydrodynamic bearing apparatus used in other devices than motors in the same manner.

Figure 5:
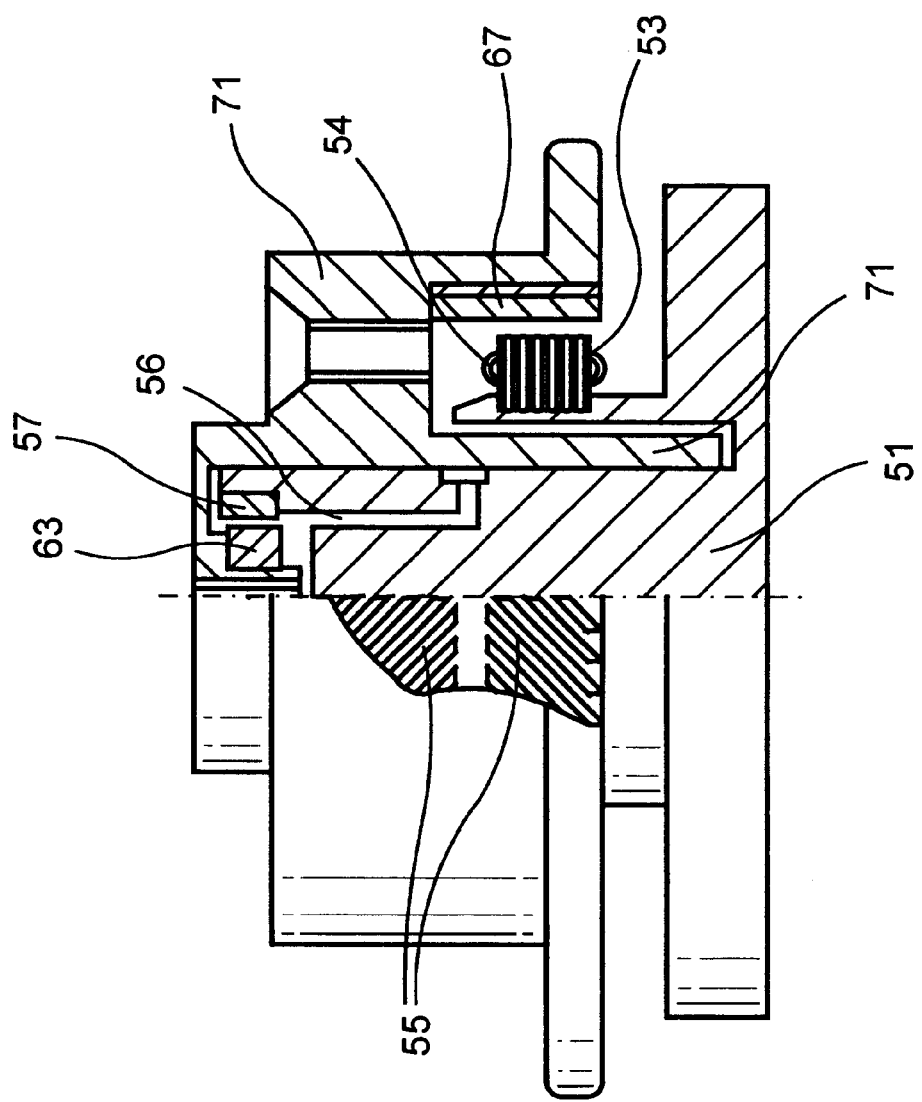
FIG. 5 is a cross-sectional view of an example of a fixed-shaft-type hard disk drive motor having the hydrodynamic bearing to which the present invention is applied.
Figure 8A:
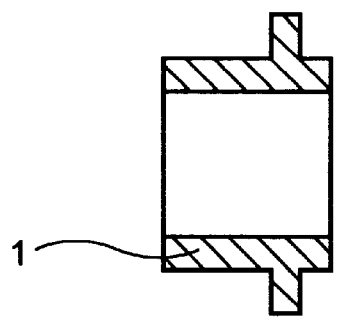
FIGS. 8a, 8b, 8c and 8d show a manufacturing process of a conventional shaft fitting unit.
Figure 8B:
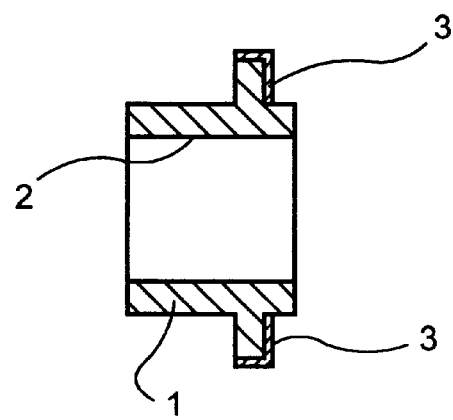
Figure 8C:
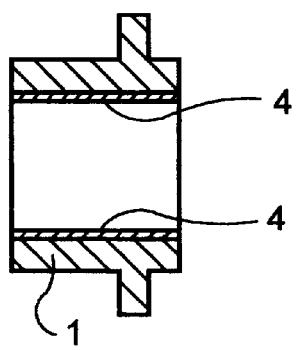
Figure 8D:
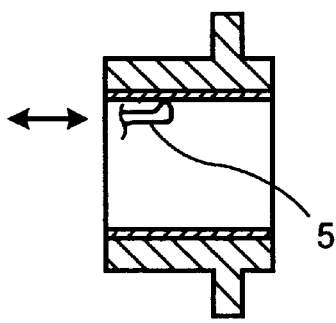
Figure 9A:
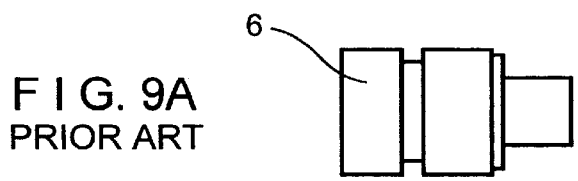
FIGS. 9a, 9b, 9c, 9d, 9e and 9f show a manufacturing process of a conventional shaft unit.
Figure 9B:
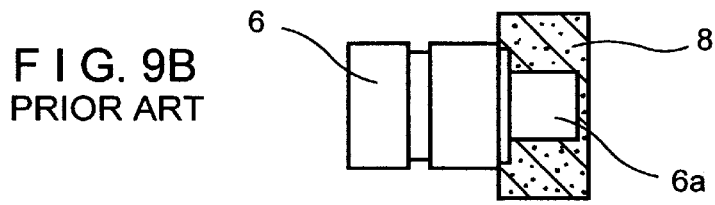
Figure 9C:
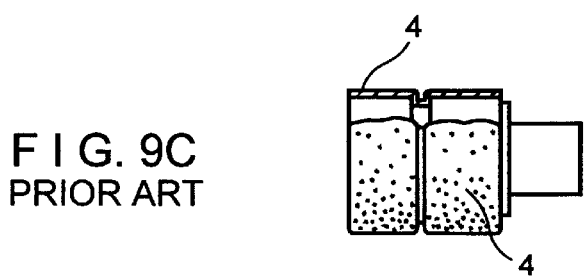
Figure 9D:
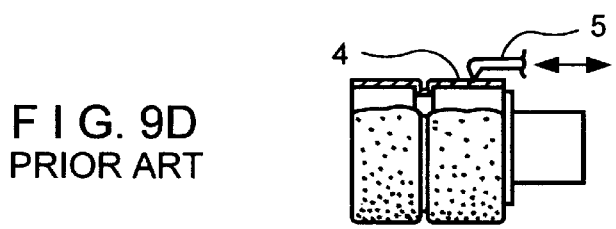
Figure 9E:
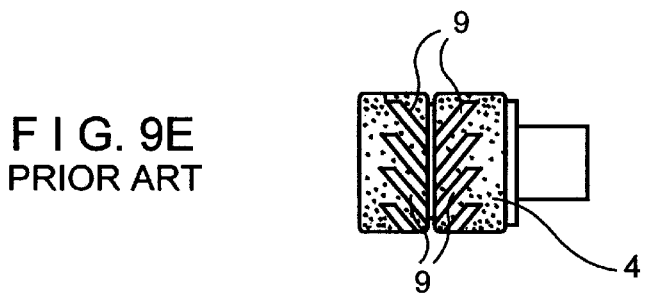
Figure 9F:
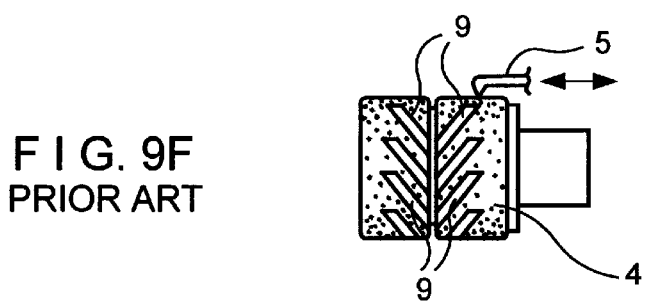
Figure 10A:
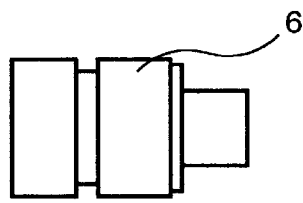
FIGS. 10a, 10b, 10c, 10d, 10e and 10f show a manufacturing process of another conventional shaft unit different from the one of FIG. 9.
Figure 10B:
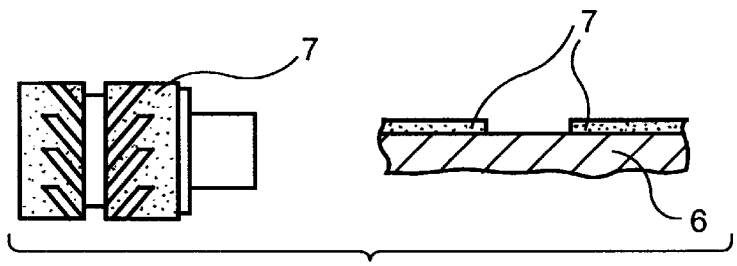
Figure 10C:
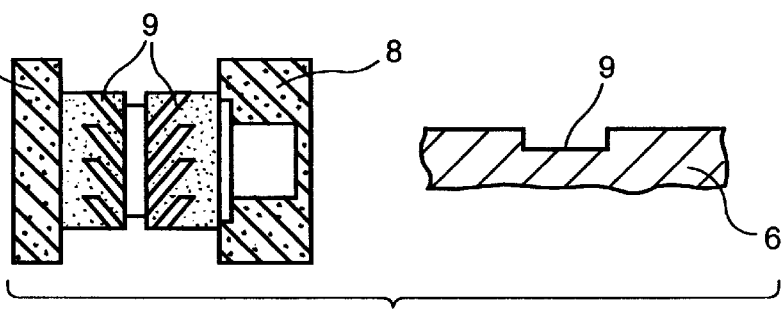
Figure 10D:
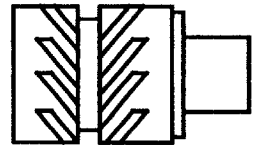
Figure 10E:
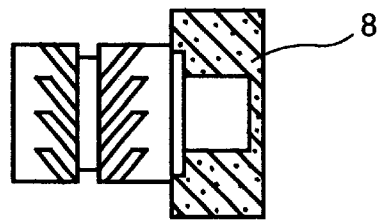
Figure 10F:
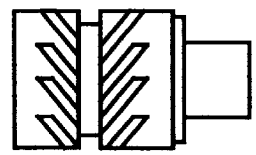

For example, the present invention can be applied to a hydrodynamic bearing apparatus formed in a hard disk drive (HDD) motor illustrated in FIG. 5 in which the members corresponding to those in the embodiment of FIG. 4 are identically coded.

The embodiment shown by FIG. 5 differs from the embodiment shown by FIG. 4 in that a cylindrical portion at the center of a hub 71 (as a shaft fitting unit) constituting the rotor is rotatably supported against the fixed shaft 51 (as a shaft unit) via the air hydrodynamic bearing. A recording medium such as a magnetic disk (not illustrated) is held along the outer circumferential surface of the hub 71.

Described next is an inner rotor type motor having a rotary-shaft-type air hydrodynamic bearing apparatus for rotating a polygon mirror 11 of FIG. 6.

In FIG. 6, a rotor (a shaft unit) 12 is rotatably inserted into a bearing (shaft fitting unit) 15 fixed on a base 18 by screw, putting a gap of several $\mu$m to ten several rum therebetween. The rotor 12 is rotatably supported at high speed by the air hydrodynamic bearing 14 which is formed with the hydrodynamic pressure generating grooves 25 formed in spiral on the outer circumferential bearing surface 24 of the rotor 12 and the inner circumferential bearing surface of the bearing 15.

A drive coil 19 is fitted and fixed to the outer circumference of the center column portion of the base 18, and an annular magnet 20 which creates a magnetic circuit for driving is placed to face the drive coil 19 circumferentially.

The annular magnet 20 is placed inside the rotor 2 via an iron yoke 29, and constitutes a motor drive portion together with the drive coil 19.

An annularly protruded portion 23 is formed at the tip end (the top portion in the figure) of the rotor 12, and a polygon mirror 11 is fitted thereto. A balance plate 26 is coaxially placed on the polygon mirror 11 via a waveform spring 27. The polygon mirror 11 is fixed by screwing the fixing screw 28, inserted from the balance plate 26 side, into the annularly protruded portion 23.

A pair of annular magnets 21, 22 are respectively mounted on the top outer circumference of the center column portion of the base 18 and the inner circumference of the balance plate 26 such that they face circumferentially. Each of the annular magnets 21 and 22 is polarized in the axial direction (in the up and down direction in the figure) to mutually cause magnetic attraction, by which the rotor 12 is sustained at a predetermined position in the thrust direction.

When a predetermined driving voltage is applied to the drive coil 19, the polygon mirror 11 is rotated together with the rotor 12. A laser light that is converged on the polygon mirror 11 upon the rotation of the polygon mirror 11 scans an image recording medium (not illustrated). At this time, the rotor 12 is supported in the radial direction by air hydrodynamic pressure generated between the rotor 12 and the bearing 15, and also sustained by the magnetic thrust bearing formed of a pair of the annular magnets 21 and 22.

As illustrated in FIG. 7, the bearing (as shaft fitting unit) 15 is formed of an aluminum material such as aluminum, aluminum alloy, etc., and the lubricant coating 16 is given on the inner circumferential surface (hydrodynamic bearing surface) of the bearing 15 through the electrodeposition, as described above.

As described above, in the present invention, an even lubricant coating is formed on either one of the hydrodynamic bearing surfaces of the shaft unit and the shaft fitting unit using an even coating effects of the electrodeposition in a simple process to obtain excellent smoothness. Thus, the bearing property is improved. Therefore, the hydrodynamic bearing surface having high quality and excellent resistance can be obtained in a simple process. While improving the performance of the hydrodynamic bearing apparatus and increasing the productivity, the hydrodynamic bearing apparatus of high quality can be obtained at low cost.

While the foregoing description and drawings represent the preferred embodiments of the present invention, it will be obvious to those skilled in the art that various changes and modifications may be made therein without departing from the true spirit and scope of the present invention.

What is claimed is:

1. A method for manufacturing a hydrodynamic bearing apparatus having:

at least a pair of hydrodynamic bearing surfaces that face each other in the radial direction being formed with an outer circumferential surface of a shaft unit and an inner circumferential surface of a shaft fitting unit relatively and rotatably attached to said shaft unit;

hydrodynamic pressure generating grooves of a predetermined shape being produced on either one of said hydrodynamic bearing surface of said shaft unit and said shaft fitting unit; and a lubricant coating being formed by electrodeposition on either of the hydrodynamic bearing surface of said shaft unit and said shaft fitting unit, said method comprising the steps of:

forming at least said pair of hydrodynamic bearing surfaces that face each other in radial direction with the outer circumferential surface of the shaft unit and the inner circumferential surface of the shaft fitting unit relatively and rotatably attached to the shaft unit;

producing hydrodynamic pressure generating grooves of a predetermined shape on either one of said hydrodynamic bearing surfaces of said shaft unit and shaft fitting unit; and putting either one of the hydrodynamic bearing surfaces of said shaft unit and said shaft fitting in an electrodeposition chamber to form the lubricant coating by electrodeposition wherein said lubricant coating is provided in a predetermined thickness on said hydrodynamic bearing surface of said shaft unit or said shaft fitting unit on which said hydrodynamic pressure generating grooves are produced, and said hydrodynamic pressure generating grooves are produced using a masking step producing the grooves between the outer surface of said lubricant coating consisting of said electrodeposition coating portion and the outer surface of non-electrodeposition coating portion where the electrodeposition coating is not provided.

2. The method of manufacturing a hydrodynamic bearing apparatus as set forth in claim 1 wherein an anodic oxidization coating is formed on the other hydrodynamic bearing surface of said shaft unit or said shaft fitting unit.

3. The method of manufacturing a hydrodynamic bearing apparatus as set forth in claim 2 wherein said shaft unit or said shaft fitting unit on which said anodic oxidization coating is deposited is formed of aluminum, aluminum alloy, or magnesium alloy.

4. The method of manufacturing a hydrodynamic bearing apparatus as set forth in claim 2 wherein said anodic oxidization coating is made of a hard alumetized layer.

5. The method of manufacturing a hydrodynamic bearing apparatus as set forth in claim 1 wherein said non-electrodeposition coating portion is coated with an insulating coating.

6. The method of a manufacturing a hydrodynamic bearing apparatus as set forth in claim 5 wherein said insulating coating in said non-electrodeposition coating portion is peeled off.

7. A method for manufacturing a hydrodynamic bearing apparatus comprising the steps of:

forming at least a pair of hydrodynamic bearing surfaces that face each other in the radial direction with an outer circumferential surface of a shaft unit and an inner circumferential surface of a shaft fitting unit relatively and rotatably attached to said shaft unit;

producing hydrodynamic pressure generating grooves of a predetermined shape on either one of said hydrodynamic bearing surfaces of said shaft unit and shaft fitting unit; and putting either one of the hydrodynamic bearing surfaces of said shaft unit and said shaft fitting unit in an electrodeposition chamber to form a lubricant coating by electrodeposition putting the hydrodynamic bearing surface into the coating material including lubricant particles dispersed in water for carrying out the electrodeposition on the hydrodynamic bearing surface;

heating the hydrodynamic bearing surface for surfacing the lubricant particles on the hydrodynamic bearing surface to cure and form the lubricant coating.

8. The method for manufacturing a hydrodynamic bearing apparatus as set forth in claim 7 wherein the outer hydrodynamic bearing surface of said shaft unit or said shaft fitting unit is put in an anodic oxidization treatment chamber to form an anodic oxidation coating on the surface thereof.

9. The method for manufacturing a hydrodynamic bearing apparatus as set forth in claim 8 wherein said anodic oxidization coating is formed by a hard alumetizing treatment.

10. A method for manufacturing a hydrodynamiceaing apparatus comprising steps of:

forming at least a pair of hydrodynamic bearing surfaces that face each other in the radial direction with an outer circumferential surface of a shaft unit and an inner circumferential surface of a shaft fitting unit relatively and rotatably attached to said shift unit;

producing hydrodynamic pressure generating grooves of a predetermined shape on either one of said hydrodynamic bearing surface of said shaft unit and shaft fitting unit;

first coating an insulating coating on the portion in said hydrodynamic bearing surface of said shaft unit or said shaft fitting unit, on which hydrodynamic pressure generating grooves are formed;

providing a coating by electrodeposition to said hydrodynamic bearing surface of said shaft unit or said shaft fitting unit;

forming a lubricant coating consisting of electrodeposition coating portion in a predetermined thickness on the portion other than the portion having said insulating coating thereon by putting the hydrodynamic bearing surface into the coating material including lubricant particles dispersed in water for carrying out the electrodeposition on the hydrodynamic bearing surface;

heating the hydrodynamic bearing surface for surfacing the lubricant particles on the hydrodynamic bearing surface to cure and form the lubricant coating; and forming said hydrodynamic pressure generating grooves by forming a step between the outer surface of said lubricant coating consisting of said electrodeposition coating portion and the outer surface of non-electrodeposition coating portion on which electrodeposition coating is not provided.

11. The method for manufacturing a hydrodynamic bearing apparatus as set forth in claim 10 wherein said insulating coating in said non-electrodeposition coating portion is peeled off.

12. The method for manufacturing a hydrodynamic bearing apparatus as set forth in claim 10 wherein said insulating coating is coated by a masking printing method.

13. The method for manufacturing a hydrodynamic bearing apparatus as set forth in claim 10 wherein said insulating coating consists of an epoxy type rein coating material.

* * * * *